Jan. 25, 1938.   H. DEBOR   2,106,494
HOLLOW VESSEL FOR HIGH PRESSURES
Filed May 31, 1930   2 Sheets-Sheet 1
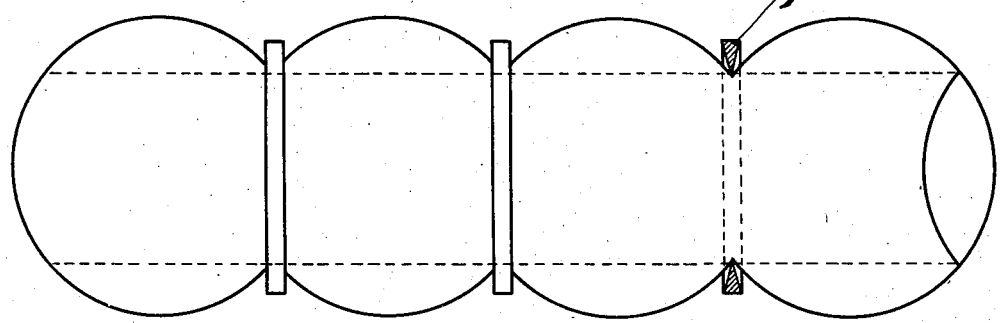
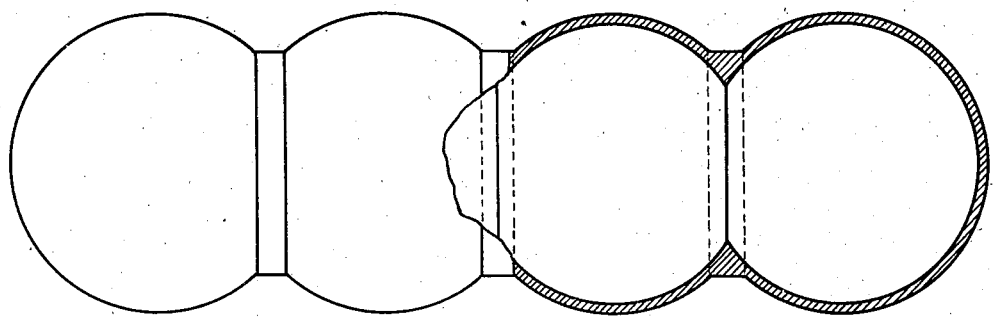
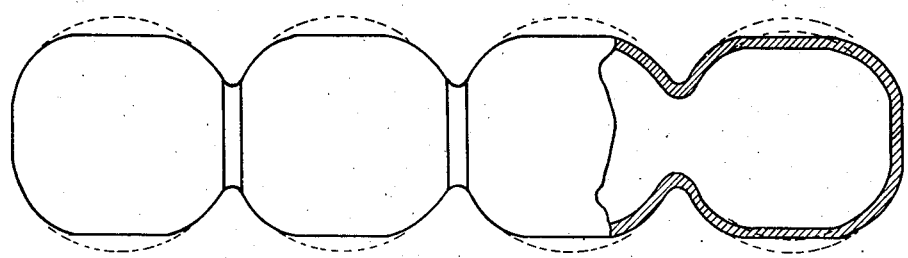
Hermann Debor
INVENTOR:
By
Attorney Jan. 25, 1938. H. DEBOR 2,106,494
HOLLOW VESSEL FOR HIGH PRESSURES
Filed May 31, 1930 2 Sheets-Sheet 2
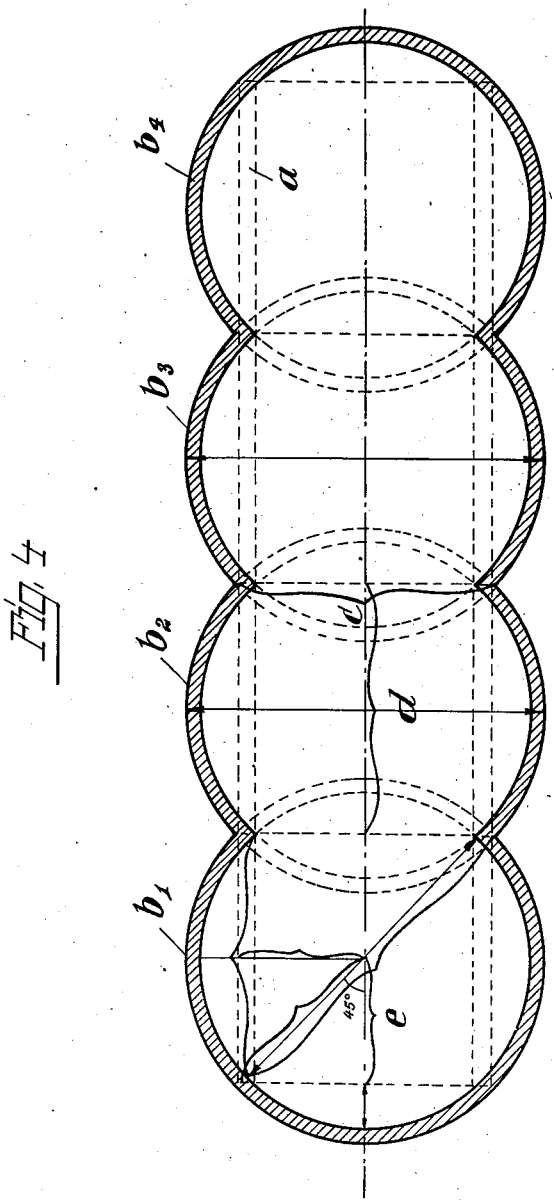
Hermann Debor
INVENTOR
By (signature)
his Attorney.

Patented Jan. 25, 1938

2,106,494

UNITED STATES PATENT OFFICE 2,106,494

HOLLOW VESSEL FOR HIGH PRESSURES

Hermann Debor, Munich, Germany, assignor to Dominion Oxygen Company, Limited, a corporation of Canada Application May 31, 1930, Serial No. 458,435
In Germany October 12, 1929

14 Claims. (Cl. 220—3)

The invention is concerned with hollow vessels, such as steel flasks, steam boilers, and the like, which are adapted to withstand high pressures. Objects of the invention are to increase the capacity of hollow vessels without increasing the weight or to decrease the weight without decreasing the capacity.

This is accomplished by constricting the vessel at proper intervals and causing it to expand in a spherical shape between the strictures.

The manufacture of such hollow vessels may be effected by internally applying an expanding medium under high pressure. After this dilation or expansion the vessel is preferably subjected to a heat treatment for the purpose of normalizing the crystal structure of the metal.

The accompanying drawings show various embodiments of the invention as follows:

Fig. 1, one form of a high-pressure vessel,
Fig. 2, a second form, partly in longitudinal section,
Fig. 3, a third form, partly in longitudinal section,
Fig. 4, a fourth form in longitudinal axial section.

The form of the vessel shown in Fig. 1 consists of a body which is constricted at substantially uniform intervals and is expanded to assume a spherical shape between the strictures. Pressure-resisting rings ($f$) which have a triangular shape in cross-section are placed in the strictures.

Fig. 2 shows a cast hollow vessel in which the strictures are reinforced by the provision of a surplus of cast metal to avoid the use of pressure-resisting rings as shown in Fig. 1.

Fig. 3 represents a hollow cylinder whose original diameter is represented by the vertical distance between the solid lines. The diameter has been decreased by the drawing in at the strictures, while the spaces between the strictures were later inflated to a spherical form as is shown by dotted lines.

The vessel shown in Fig. 4, which may, for example, be produced by the outward expansion of a cylinder indicated by the dotted line $a$ in a suitable die or matrix under high pressure, consists of several spherical zones $b_1$—$b_2$. These hollow spherical or spheroidal zones are alined, and adjoining zones are directly connected to one another along their lines of intersection, which lines are circles whose diameters are common chords of the adjoining zones. The diameter $c$ of the spherical intersections is equal to the diameter of the cylinder $a$ and also equal to the distances $d$ of the spherical zones. The diameter $e$ of the calottes $b$ thus forms the hypothenuse of a right isosceles triangle with the catheti $c$ and $d$.

Accordingly, the improved container consists of a plurality of interconnected spheroidal zones arranged along the main longitudinal axis of the container, each spheroidal zone having an opening angle of at least 80° and every portion of each zone having its center of curvature located in or closely adjacent the main longitudinal axis of said container. By "opening angle" is meant the angle or arc enclosed between any two radii in the same plane drawn from the center of a zone to the constrictions constituting the boundary of said zone.

What I claim is:

1. A container adapted to withstand internal pressure comprising a casing consisting of a plurality of interconnected and intersecting hollow spherical zones, the distance between successive planes of intersection being substantially equal to the diameter of the planes of intersection.

2. A metallic container for compressed fluids to be stored and transported under conditions which render it desirable that the weight and surface area of the container be reduced to a minimum, while the capacity and the resistance to internal pressures attain a maximum, said container comprising a plurality of spheroidal hollow bodies, each of said bodies intersecting at least another such body along a plane whose greatest dimension is considerably less than the greatest inner dimension of each of said bodies, whereby the total capacity of said vessel tends to approach the capacity of the sum of said spheroidal bodies as if each were a complete sphere, the wall thickness of the spheroids being less than the wall thickness of their points of intersection.

3. A container as defined in claim 2 in which the difference in the wall thickness between the spheroids and their intersections is obtained by strengthening the periphery of the planes of intersection.

4. A container adapted to withstand internal pressure comprising a casing consisting of a plurality of interconnected hollow transversely spherical zones having opening angles of at least 80°, the end zones being closed, and a ring-like constrictive reinforcing means encircling the intersection between each pair of adjacent spherical zones functioning radially to hold in by its tension that portion of the container which it encircles.

5. A container adapted to withstand internal pressure comprising a casing consisting of a plurality of interconnected hollow transversely spherical zones, the end zones being closed by substantially spherical calottes, and a ring-like constrictive reinforcing means encircling the intersection between each pair of adjacent spherical zones functioning radially to hold in by its tension that portion of the container which it encircles.

6. A container adapted to withstand internal pressure comprising a casing consisting of a plurality of interconnected hollow transversely spherical zones, the end zones being closed, and a ring-like constrictive reinforcing means encircling the intersection between each pair of adjacent zones functioning radially to hold in by its tension that portion of the container which it encircles, the geometric centers of the spherical zones being disposed upon the main axis of the container.

7. A container adapted to withstand internal pressure comprising a casing consisting of a plurality of interconnected hollow transversely spherical zones having opening angles of at least 80°, the end zones being closed, and means for reinforcing the intersection between each pair of adjacent spherical zones.

8. A metal container adapted to withstand high internal pressure comprising a metallic casing consisting of a plurality of interconnected hollow substantially spherical zones, and substantially spherical calottes closing the zones at the ends of said casing, the geometric centers of said zones and said calottes being located in and along the main longitudinal axis of the container.

9. A metal container adapted to withstand high internal pressure comprising a metallic casing consisting of a plurality of interconnected hollow spheroidal zones, adjoining zones intersecting one another, and a reinforcing ring coextensive with and embracing each of such intersections.

10. A metal container adapted to withstand high internal pressure and comprising a plurality of alined hollow substantially spherical zones, adjoining zones being directly connected to one another along lines which are circles whose diameters are common chords of said adjoining zones.

11. A metal container according to claim 10, including reinforcing means coextensive with such lines of connection.

12. A metallic container adapted to withstand internal pressure, said container having spaced circumferential constrictions, spheroidal zones between successive constrictions, and spheroidal zones closing the ends of said container, every portion of each of said zones having its center of curvature located in or closely adjacent the main longitudinal axis of said container.

13. A metallic container as claimed in claim 12, comprising reinforcing means coextensive with said constrictions, and in which said zones are severally and successively directly connected together at said constrictions.

14. A metal container adapted to withstand high internal pressure and comprising a plurality of aligned hollow substantially spherical zones having opening angles of at least 80°, the geometric centers of said zones being located in and along the main longitudinal axis of the container, adjoining zones being directly connected to one another along lines which are circles whose diameters are common chords of said adjoining zones, and at least one of the end zones of said container being closed by a spherical calotte.

HERMANN DEBOR.